(12) United States Patent
Chang et al.

(10) Patent No.: US 8,911,536 B2
(45) Date of Patent: Dec. 16, 2014

(54) METHOD AND APPARATUS FOR RAPID ADSORPTION-DESORPTION $CO_2$ CAPTURE

(71) Applicants: Ramsay Chang, Mountain View, CA (US); Adam Berger, San Mateo, CA (US); Abhoyjit Bhown, Palo Alto, CA (US)

(72) Inventors: Ramsay Chang, Mountain View, CA (US); Adam Berger, San Mateo, CA (US); Abhoyjit Bhown, Palo Alto, CA (US)

(73) Assignee: Electric Power Research Institute, Inc., Charlotte, NC (US)

( * ) Notice: Subject to any disclaimer, the term of this patent is extended or adjusted under 35 U.S.C. 154(b) by 0 days.

(21) Appl. No.: 13/903,047

(22) Filed: May 28, 2013

(65) Prior Publication Data
US 2013/0255488 A1  Oct. 3, 2013

Related U.S. Application Data

(62) Division of application No. 13/075,471, filed on Mar. 30, 2011.

(51) Int. Cl.

| | |
|---|---|
| *B01D 53/22* | (2006.01) |
| *B01D 53/04* | (2006.01) |
| *B01D 53/02* | (2006.01) |
| *B01J 20/28* | (2006.01) |
| *B01J 20/34* | (2006.01) |
| *B01D 53/62* | (2006.01) |
| *B01J 20/26* | (2006.01) |

(52) U.S. Cl.
CPC ...... *B01D 53/0407* (2013.01); *B01D 2257/504* (2013.01); *B01D 2259/4009* (2013.01); *B01D 53/02* (2013.01); *B01J 20/28033* (2013.01); *B01D 53/228* (2013.01); *B01D 2253/25* (2013.01); *Y02C 10/08* (2013.01); *Y02C 10/04* (2013.01); *B01J 20/3425* (2013.01); *B01J 20/28026* (2013.01); *B01D 53/229* (2013.01); *B01D 53/62* (2013.01); *B01J 20/261* (2013.01); *B01D 2259/402* (2013.01); *Y02C 10/10* (2013.01); *B01D 2253/342* (2013.01); *B01D 2258/0283* (2013.01)

USPC ............. 95/51; 95/43; 95/45; 95/90; 95/148; 96/4; 96/10

(58) Field of Classification Search
USPC .................... 95/43, 45, 51, 90, 148; 96/4, 10
See application file for complete search history.

(56) References Cited

U.S. PATENT DOCUMENTS

| | | | | |
|---|---|---|---|---|
| 3,460,897 | A * | 8/1969 | Lowes, Jr. ................... | 8/115.69 |
| 5,194,158 | A | 3/1993 | Matson | |
| 6,352,577 | B1 | 3/2002 | Martin et al. | |
| 7,138,006 | B2 * | 11/2006 | Miller et al. ...................... | 95/45 |
| 7,341,618 | B2 * | 3/2008 | Bayer et al. ..................... | 96/108 |
| 7,422,724 | B1 | 9/2008 | Manginell et al. | |
| 7,618,477 | B2 * | 11/2009 | Pullumbi et al. .................. | 95/96 |
| 8,133,308 | B2 | 3/2012 | Lively et al. | |
| 8,383,026 | B1 | 2/2013 | Luebke et al. | |
| 8,409,332 | B2 * | 4/2013 | Lively et al. .................... | 95/148 |
| 2003/0033929 | A1 | 2/2003 | Pinnau et al. | |
| 2003/0054150 | A1 | 3/2003 | Evans | |
| 2008/0282884 | A1 | 11/2008 | Kelley et al. | |
| 2008/0282885 | A1 | 11/2008 | Deckman et al. | |
| 2008/0282886 | A1 | 11/2008 | Reyes et al. | |
| 2008/0282892 | A1 | 11/2008 | Deckman et al. | |
| 2008/0314246 | A1 | 12/2008 | Deckman et al. | |
| 2009/0025555 | A1 * | 1/2009 | Lively et al. .................... | 95/114 |
| 2012/0152117 | A1 * | 6/2012 | Lively et al. .................... | 95/139 |
| 2013/0012379 | A1 * | 1/2013 | Edmiston ...................... | 502/402 |

* cited by examiner

*Primary Examiner* — Jason M Greene
*Assistant Examiner* — Anthony Shumate
(74) *Attorney, Agent, or Firm* — Trego, Hines & Ladenheim, PLLC

(57) ABSTRACT

An apparatus for capture and sequestration of $CO_2$ from fossil fuel-fired power plant flue gas includes a polymer matrix embedded with a sorbent suitable for removing $CO_2$ from the flue gas and a spacer mated with the polymer matrix. The spacer is adapted to create channels between adjacent portions of the polymer matrix such that the flue gas flows through the channels and comes in contact with the sorbent. Further, an apparatus for the capture and sequestration of $CO_2$ from fossil fuel-fired power plant flue gas includes a hollow fiber membrane embedded with an adsorbent or other suitable material for removing $CO_2$ from the flue gas. The adsorbent particles may be embedded into a wall of the membrane.

7 Claims, 4 Drawing Sheets

METHOD AND APPARATUS FOR RAPID ADSORPTION-DESORPTION $CO_2$ CAPTURE

BACKGROUND OF THE INVENTION

The present invention relates generally to a method and apparatus for rapid adsorption-desorption $CO_2$ capture.

The capture and sequestration of $CO_2$ from fossil fuel-fired power plant flue gas is an important step in controlling global warming due to fossil plant energy production.

$CO_2$ separation and capture from flue gases of various stationary sources can be described by either post-combustion, pre-combustion, or oxy-combustion configurations. In the post-combustion configuration, $CO_2$ is captured from the flue gas after the fuel is combusted. When air is used as an oxidant, the combustion flue gas is diluted with the nitrogen in the air; thus, the $CO_2$ concentration in the post combustion flue gas is usually low and ranges from 10-15% by volume for a pulverized coal (PC) fired power plant. For each MW of electric generation capacity, a PC boiler produces a flue gas volume of about 3,500 acfm and emits roughly 1 ton of $CO_2$ each hour. Due to the low concentration of $CO_2$ in the flue gas, low operating pressure, and large volume of flue gas to treat, the post-combustion configuration requires larger equipment and, hence, a higher capital cost.

One option available for lowering the capital cost is post-combustion capture using sorbent beds to adsorb the $CO_2$ from the flue gas. However, current sorbent bed technologies require very large beds of granular sorbents, are difficult to regenerate, and require high energy consumption. Based on the operation modes, adsorption processes include temperature swing adsorption (TSA), pressure swing adsorption (PSA), and vacuum swing adsorption (VSA). VSA is a PSA process in nature. Adsorption processes have several process configurations, such as fixed bed, moving bed, fluidized bed, and simulated moving bed (SMB). Most of the TSA and PSA processes employ the fixed bed configuration. FIGS. 1 and 2 show typical TSA and PSA adsorption processes for $CO_2$ separation.

In adsorption processes, gases or vapors can be captured through chemical or physical interaction with a porous solid adsorbent such as zeolite or activated carbon. Gas separation is achieved when certain species are preferentially adsorbed and subsequently regenerated at high purity.

For TSA applications, $CO_2$ is generally adsorbed at temperatures between 10° C. and 60° C. while regeneration is conducted at greater than 100° C. With large beds, it takes a long time to heat up (to regenerate, such as using steam) and cool down (for adsorption, such as using air) due to heat transfer limitations. The steam used for heating also attacks some of the sorbents, especially if they condense and collect on the sorbent surface. During the adsorption cycle, mass transfer and diffusion is a rate limiting step requiring very large beds to adsorb $CO_2$ due to the large quantity of $CO_2$ to be adsorbed and the large granules needed for the beds. In addition, pressure drop across the beds is also a concern.

For example, in a typical TSA implementation for a 500 MW PC power plant, $CO_2$ emission from the power plant is about 500 ton/hr. The following conditions are assumed for the TSA process:

$CO_2$ removal rate from the flue gas: 90%
$CO_2$ working capacity for the adsorbent: 8% (could be significantly lower)
Adsorption/desorption cycle time in TSA: 2 hours
Bed utilization: 90%

According to these assumptions, the total amount of sorbent required is:

Total sorbent=500*90%*2*/8%/90%=12,500 (ton).

This results in a large amount of sorbent. Using the design parameters given in Table 1 below, the minimum number of columns needed is:

Number of Columns=12500/(π*3.1*3.1*32/4)/0.8=65

The total bed volume (65 columns of sorbent material) required is 15,600 m³.

TABLE 1

|  | Column diameter (m) | Height (m) | Working capacity (g $CO_2$/g sorbent) | Cycle time (hour) | Sorbent packing density (ton/m³) | Columns required |
|---|---|---|---|---|---|---|
| TSA | 3.1 | 32 | 0.08 | 2 | 0.8 | 65 |

It should be pointed out that the adsorption-desorption cycle time may vary. However, considering a column size of 3.1 m in diameter and 32 m in height the total cycle time (mostly because of heating and cooling the adsorbent during regeneration) of 2 hours for a TSA process is very moderate. Real cycle time may be well above 2 hours and the column number will accordingly increase.

BRIEF SUMMARY OF THE INVENTION

These and other shortcomings of the prior art are addressed by the present invention, which provides an apparatus and method for the capture and sequestration of $CO_2$.

According to one aspect of the invention, an apparatus for capture and sequestration of $CO_2$ from coal-fired power plant flue gas includes a polymer matrix embedded with a sorbent suitable for removing $CO_2$ from the flue gas and a spacer mated with the polymer matrix. The spacer is adapted to create channels between adjacent portions of the polymer matrix such that the flue gas flows through the channels and comes in contact with the sorbent.

According to another aspect of the invention, an apparatus for capture and sequestration of gas species from coal-fired power plant flue gas includes a vessel adapted to be pressurized and a hollow fiber membrane contained in the vessel. The vessel includes a lumen-side having first and second lumen-side ports disposed at opposing ends of the vessel and a shell-side having first and second shell-side ports disposed on opposing sides of a shell of the vessel. The hollow fiber membrane includes a sorbent embedded in a wall of the membrane for removing one or more species of a gas from the flue gas.

According to another aspect of the invention, a method of capturing and sequestering a gas species from coal-fired power plant flue gas includes the steps of providing a polymer matrix embedded with a sorbent, placing the polymer matrix parallel to a flow of flue gas, and subjecting the flue gas to the polymer matrix to allow the sorbent to remove one or more gas species from the flue gas. The polymer matrix is adapted to be heated and cooled rapidly.

According to another aspect of the invention, a method of capturing and sequestering a gas species from a coal-fired power plant flue gas includes the steps of providing an apparatus having a vessel adapted to be pressurized and a hollow fiber membrane contained in the vessel. The hollow fiber membrane includes a sorbent embedded therein. The method further including the steps of subjecting the hollow fiber membrane to a flow of flue gas, removing one or more gas species from the flue gas with the hollow fiber membrane, and regenerating the sorbent contained in the hollow fiber membrane.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
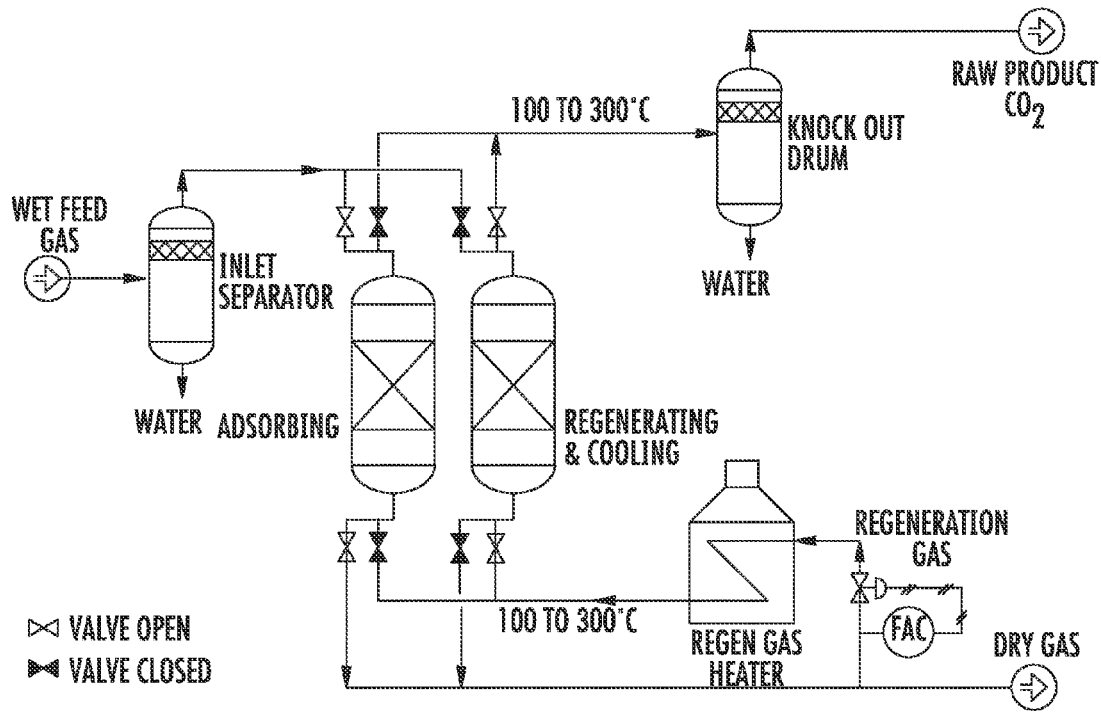
FIG. 1 is a schematic of a temperature swing adsorption (TSA) process.
Figure 2:
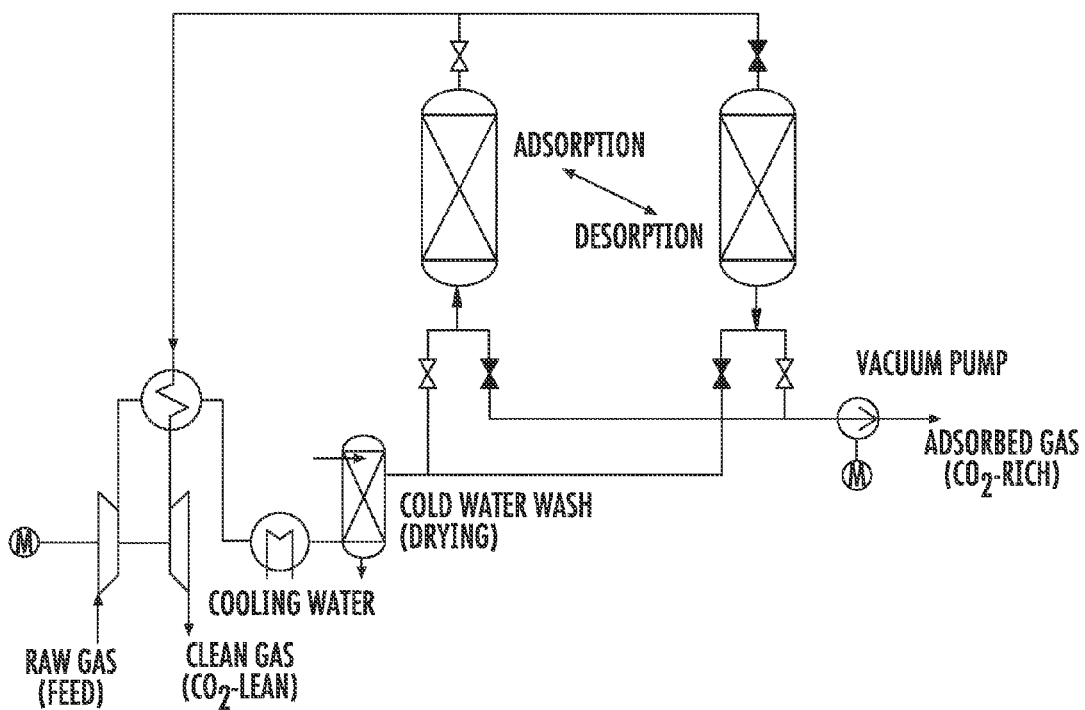
FIG. 2 is a schematic of a pressure swing adsorption (PSA) process.
Figure 3:
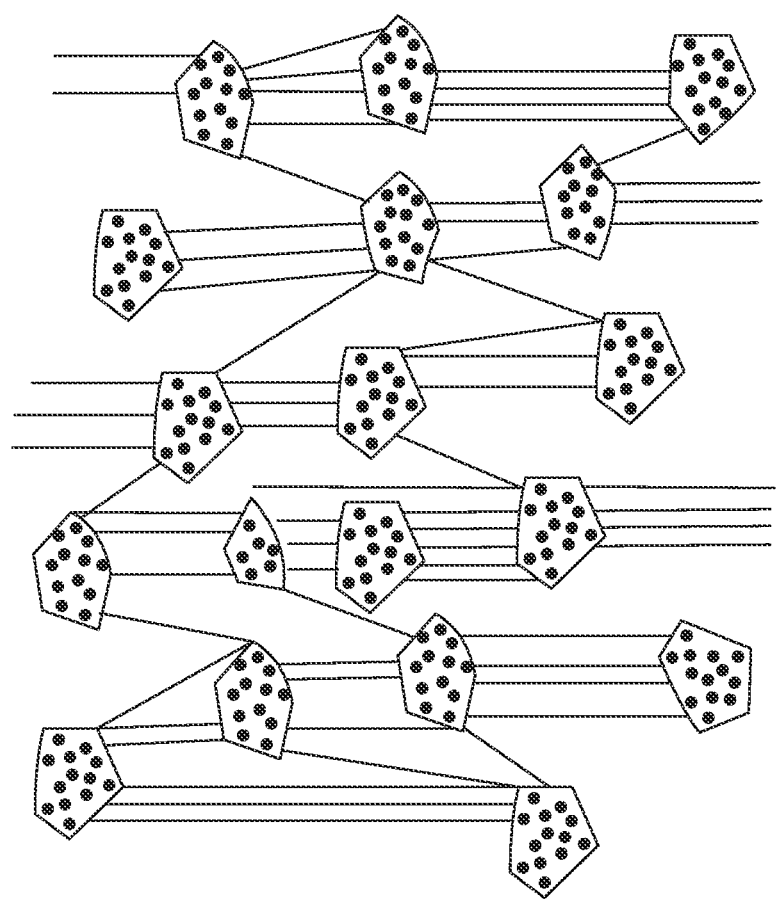
FIG. 3 shows a prior art polytetrafluoroethylene (PTFE) tape embedded with small sorbent granules.

A prior art process for embedding small sorbent granules in a polytetrafluoroethylene (PTFE) polymer matrix was developed by Gore, FIG. 3. The PTFE matrix stabilizes the sorbent while allowing for ready access to the sorbent particles. The presence of the PTFE, a hydrophobic polymer, keeps water away from the sorbent surface. This helps to prevent any sorbent pore pluggage or chemical attack. Since sorbents can be readily embedded in relatively thin sheets of a PTFE tape, any gas phase components can easily access the sorbents with minimal mass transfer resistance.

In adsorption-based separation processes, the two primary means to drive the separation are temperature and/or pressure. In the process, an adsorbent bed is subjected to changes in either or both of these to affect a separation of a mixture into its components.

In prior work, it has been shown that the key to minimizing the size of the adsorbent bed is to use devices that (1) setup flow channels that allow for convective flow of the gas mixture that is to be separated as well as the separated components, and (2) hold the adsorbent particles between the flow channels and yet allow for convective flow (more preferably) or diffusive flow (less preferably) around the particles. By constructing adsorbent modules that offer both attributes, the adsorbent bed size can be reduced by a factor of as much as 100.

Figure 4:
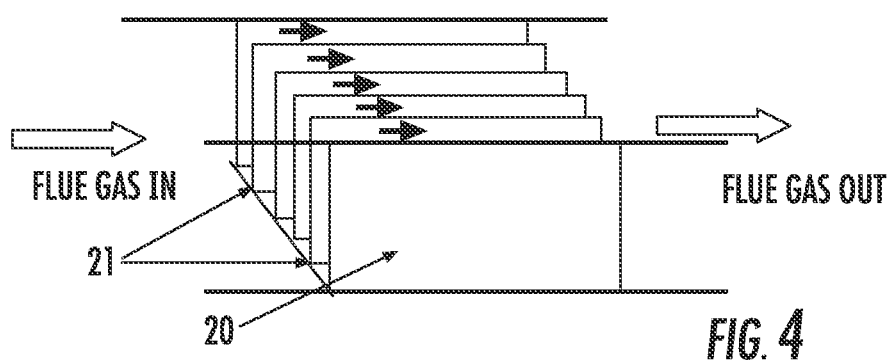
FIG. 4 shows a polymer matrix apparatus according to an embodiment of the invention.
Figure 5:
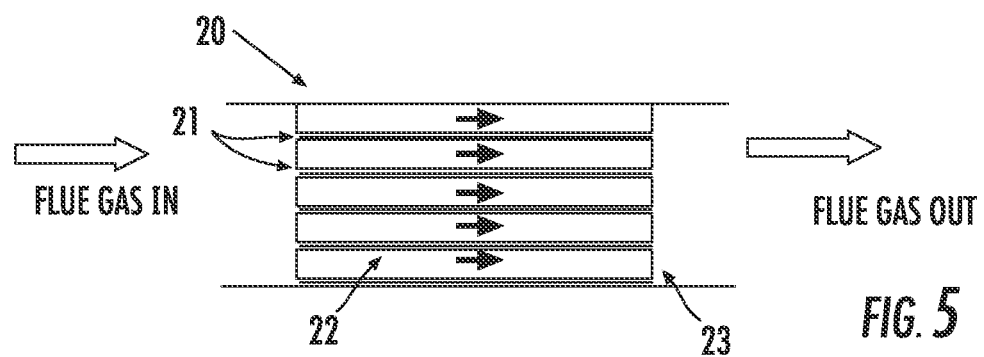
FIG. 5 shows a top view of the polymer matrix apparatus of FIG. 4.

Referring now to the present invention, FIGS. 4 and 5, a sorbent embedded module for $CO_2$ capture is shown generally at reference numeral 20. The module 20 may be placed in a flue gas duct, as shown, or in any other suitable position. Generally, a suitable $CO_2$ sorbent is embedded in a polymer matrix similar to that developed by Gore and used in a TSA process. One major advantage is that the thin sheets of the polymer matrix can be heated and cooled rapidly. During heating, direct steam injection can be used and during cooling, water, instead of air, can be used due to the hydrophobic nature of the PTFE. The ability to cool with water and the thin profile of the polymer matrix allows for very rapid cooling.

Further, since the sheets can be oriented parallel to the flow, the pressure drop is minimal compared to a fixed bed design. Some of the key benefits of the current invention for $CO_2$ capture are described below:

1) Reduction in mass transfer resistance for $CO_2$ adsorption;
2) Significant reduction in regenerating and cooling cycle time;
3) Low pressure drop;
4) Small footprint;
5) Can be used with any good $CO_2$ sorbent; and
6) Less affected by flue gas components such as water, SOx, mercury etc.

A comparison of the typical TSA described in table (1) with the PTFE rapid TSA, implemented for a similar 500 MW PC power plant emitting 500 ton/hr of $CO_2$ was performed. The following conditions are assumed for the PTFE rapid TSA:

$CO_2$ removal rate from the flue gas: 90%
$CO_2$ working capacity for the adsorbent: 2% (conservative estimate)
Adsorption/desorption cycle time in TSA: 6 minutes (0.1 hours)
Sorbent Utilization 60% (conservative estimate)

According to these assumptions, the total amount of PTFE with embedded sorbent required can be calculated:

$$\text{Total sorbent} = 500*90\%*0.1/2\%/60\% = 3{,}750 \text{ tons.}$$

3,750 tons is 30% of the original 12,500 tons of sorbent required by the typical TSA process, thus, only 30% of the material would be required.

The apparatus 20 includes sheets of PTFE tape 21 embedded with sorbent and spacers 22 to provide channels 23 between adjacent sheets of PTFE tape 21. The spacers 22 may be of a flexible material and may include a matrix of channels or other suitable configuration to allow the flow of gas therethrough. This configuration allows the flue gas to flow through the channels 23 of the adjacent sheets 21 such that the flue gas comes into contact with the sorbents contained in the tape 21. Assuming the bulk density of apparatus 20 to be approximately 0.5 tons/m$^3$ (tape with spacer material), the apparatus 20 would require 3,750/0.5=7,500 m$^3$ of material for a 500 MWe plant compared to 15,600 m$^3$ for a typical TSA sorbent bed, Table 1. The material and sizing savings are directly related to the capital cost of the system.

The major reason why the size of the system is more than halved despite less favorable assumptions for the working capacity and sorbent utilization in the material is the very short cycle time that is achievable through heating and cooling by steam injection and direct water cooling. This process advance is also applicable to other sorbents with higher working capacities that can be embedded into the PTFE. With higher performance sorbents, there will be further decreases in both the size of the system and the energy required to regenerate the $CO_2$.

Figure 6:
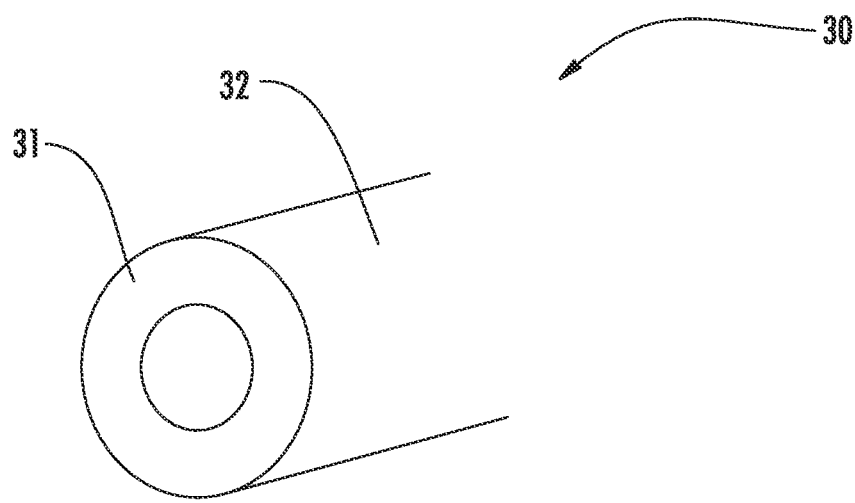
FIG. 6 shows a hollow fiber membrane according to an embodiment of the invention.
Figure 7:
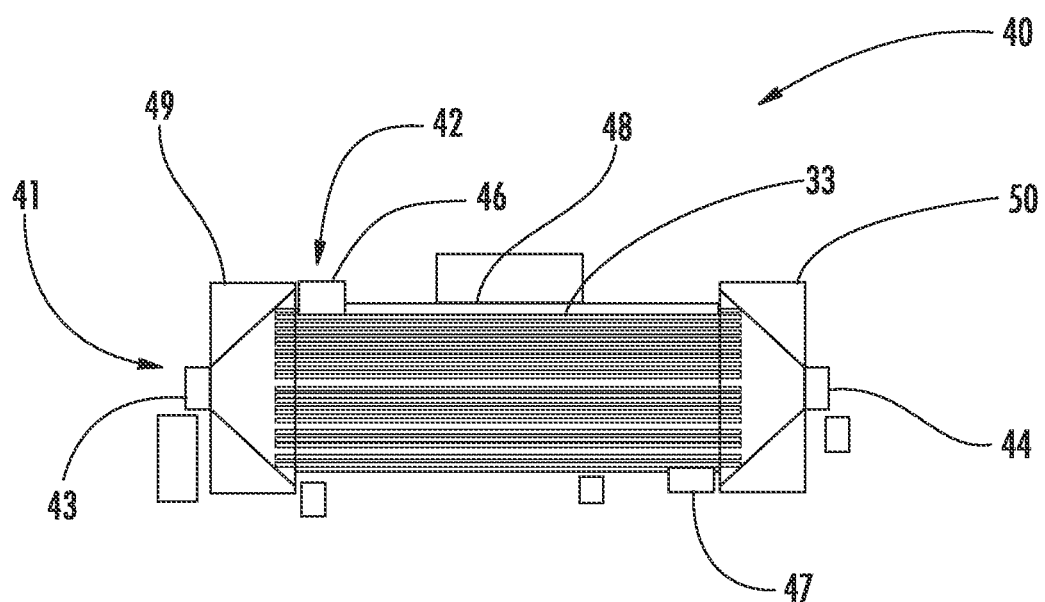
FIG. 7 shows membrane module for containing the hollow fiber membrane.

Referring now to FIGS. 6 and 7, a hollow fiber membrane embedded with an adsorbent 31 is shown at reference numeral 30. The adsorbent particles are embedded into wall 32 of the membrane 30. In a limiting case, the membrane may be made entirely of the adsorbent itself assuming the adsorbent's physical properties allow the manufacturing of a suitable membrane structure. A pre-determined number of hollow fiber membranes are formed into fiber membrane bundle 33 and are contained in a membrane module or vessel 40, FIG. 7. The vessel 40 is adapted to be pressurized and includes a shell 48 and a pair of ends 49 and 50. In a process, the gas mixture is fed either into a lumen-side 41 having first and second lumen-side ports 43 and 44 at opposing ends of the vessel 40 or a shell-side 42 having first and second shell-side ports 46 and 47 disposed on opposing sides of the shell 48 of the module 40, resulting in several process configuration options.

In a first option, the gas mixture would flow through the lumen-side by entering the first lumen port 43 and blocking the second lumen port 44 or exit port. The gas would then be pressurized within the lumen-side 41 and start to flow through the membrane walls 32 which contain the adsorbent. The adsorbent would selectively adsorb one or more species from the gas mixture and the non-adsorbing species would be collected from the shell-side port 47 and gradually removed. This flow would continue until the adsorbent is essentially saturated with the adsorbed species upon which time the flow would be stopped and switched to a second fiber membrane bundle 33. Once the flow has stopped, the lumen-side 41 would be depressurized and a back-flow of the non-adsorbing gas from the shell-side 42 would be used to regenerate the adsorbent. This 4-step cycle is common in pressure swing cycles.

A second option is to feed the gas through the shell-side 42 and collect the non-adsorbing gas in the lumen-side 41. The overall process steps are the same for the first and second options, i.e., pressurize, flow, depressurize, and purge.

Both of the above options show an example with pressure as the driving force for adsorption. A similar set of options exists for thermal swing.

In thermal swing, the 4 steps are cooling, flow, heating, and purge. For example, a cool gas mixture (say flue gas at 50 C) is introduced into the lumen-side 41 of the fiber membrane bundles 33 with the port 44 blocked. The gas would then flow through the membrane walls 32 as described where the adsorbent would selectively adsorb one or more species in the mixture and let the remaining gas mixture species permeate into the shell-side 42 where it would be collected through port 47. Once the adsorbent is saturated, the adsorbent would be heated (to say 120 C) to regenerate the adsorbent. This heating could be done via steam directly injected into the membrane module 40 or external heating for instance.

Likewise, the gas mixture can be initially introduced into the shell-side 42 and collected in the lumen-side 41.

In all four options (two for pressure swing and two for thermal swing), the bed length is the membrane wall 32 itself. For many membrane bundles 33, this can be made thin, e.g., a few hundred microns. Such small adsorbent bed lengths, i.e., thin membrane walls, are key to enabling rapid frequency pressure and/or thermal swing cycles which in turn dramatically reduce the size of the adsorbent bed.

The specific geometry of the bed is not critical to this application, but what is critical is the size of the bed: it must be as small/thin as possible. Eventually, the thickness of the bed will be dictated by other factors in the process, e.g., valves that are able to switch on and off at sufficiently rapid frequencies to allow for high-frequency shifts in gas flows.

For $CO_2$ separation from flue gas, short-bed, high-frequency cycles are going to be favorable because of the extraordinary large volumes of flue gas emitted from power plants. This cycle can be achieved in modules and devices that offer short adsorbent bed path lengths. Such short-bed path lengths can be achieved in a multitude of geometries such as the hollow fiber bundle shown above.

The foregoing has described an apparatus and method for rapid adsorption-desorption $CO_2$ capture. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A method of capturing and sequestering a gas species from fossil fuel-fired power plant flue gas, comprising the steps of:
    (a) providing a first polymer matrix embedded with a sorbent, the polymer matrix being adapted to be heated and cooled;
    (b) placing the first polymer matrix parallel to a flow of flue gas;
    (c) subjecting the flue gas to the first polymer matrix to allow the sorbent to remove one or more gas species from the flue gas;
    (d) heating and regenerating the first polymer matrix by directly contacting the first polymer matrix with steam; and
    (e) cooling the first polymer matrix by directly contacting the first polymer matrix with water to allow the sorbent to remove gas species from the flue gas.

2. The method according to claim 1, wherein the first matrix is made of a water repellent material.

3. The method according to claim 2, wherein the water repellent material is a polytetrafluoroethylene (PTFE).

4. The method according to claim 1, wherein the first polymer matrix is in the form of a planar sheet.

5. The method according to claim 1, further including the steps of:
    (a) providing a second polymer matrix embedded with sorbent; and
    (b) positioning the second polymer matrix parallel to the flow of flue gas and in a spaced-apart relation to the first polymer matrix to create a channel therebetween, such that the flue gas flows through the channel and contacts the sorbent embedded in the first and second polymer matrices.

6. The method according to claim 5, wherein the second polymer matrix is in the form of a planar sheet.

7. The method according to claim 5, further including the steps of:
    (a) heating and regenerating the second polymer matrix by directly contacting the second polymer matrix with steam; and
    (b) cooling the second polymer matrix by directly contacting the second polymer matrix with water to allow the sorbent to remove gas species from the flue gas.

* * * * *